(12) United States Patent
Sawada

(10) Patent No.: US 7,545,884 B2
(45) Date of Patent: Jun. 9, 2009

(54) DIGITAL BASEBAND MODULATION APPARATUS AND DEMODULATION APPARATUS

(75) Inventor: Kensuke Sawada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 607 days.

(21) Appl. No.: 10/757,083

(22) Filed: Jan. 14, 2004

(65) Prior Publication Data
US 2004/0146090 A1    Jul. 29, 2004

(30) Foreign Application Priority Data
Jan. 29, 2003  (JP)  ............... 2003-019986

(51) Int. Cl.
*H04B 1/707* (2006.01)
(52) U.S. Cl. ............... 375/308; 375/146; 375/147
(58) Field of Classification Search ........... 375/146, 375/147, 130, 296, 298, 308, 260; 370/342, 370/207, 310
See application file for complete search history.

(56) References Cited

U.S. PATENT DOCUMENTS

| | | | |
|---|---|---|---|
| 5,504,775 A * | 4/1996 | Chouly et al. ............... | 370/210 |
| 6,009,090 A | 12/1999 | Oishi et al. | |
| 6,097,714 A | 8/2000 | Nagatani et al. | |
| 6,266,320 B1 * | 7/2001 | Hedberg et al. ............ | 370/206 |
| 6,421,397 B1 * | 7/2002 | McVey ................ | 375/308 |
| 6,535,562 B1 * | 3/2003 | Mohseni et al. ............ | 375/296 |
| 6,603,777 B1 * | 8/2003 | Kubota ................ | 370/506 |
| 6,625,173 B1 * | 9/2003 | Yanagi ................ | 370/479 |
| 6,701,163 B1 * | 3/2004 | Hiramatsu ............ | 455/561 |
| 6,882,636 B1 * | 4/2005 | Kim et al. ............ | 370/342 |
| 6,944,469 B2 * | 9/2005 | Jo et al. ............ | 455/522 |
| 7,170,952 B2 * | 1/2007 | Hunton ............ | 375/296 |
| 2002/0110109 A1 * | 8/2002 | Kawaguchi et al. ...... | 370/342 |

FOREIGN PATENT DOCUMENTS

| | | |
|---|---|---|
| CN | 1185689 | 6/1998 |
| CN | 1185691 | 6/1998 |
| EP | 1 158 689 | 11/2001 |

OTHER PUBLICATIONS

Masatoshi Watanabe, Osamu Kato, Eiji Katsura, Koichi Homma, "High speed radio communication technology using parallel combinatory CDMA under multipath Rayleigh-fading interference environment", Telecom Res. Lab., Matsushita Commun. Ind. Co. Ltd., Yokohama, 1996 IEEE.*
European Search Report dated Aug. 24, 2004.
Harri Lilja et al. WCDMA Power Amplifier Requirements and Efficiency Optimization Criteria. Nokia Mobile Phones. IEEE 1999 pp. 1843-1846.
Sudhir Ramakrishna et al. A Comparison between Single Code and Multiple Code Transmission Schemes in a CDMA System. Wireless Information & Networking Laboratory IEEE 1998 pp. 791-795.
Chinese Office Action dated Sep. 8, 2006.

* cited by examiner

*Primary Examiner*—Chieh M Fan
*Assistant Examiner*—Aristocratis Fotakis
(74) *Attorney, Agent, or Firm*—Katten Muchin Rosenman LLP

(57) ABSTRACT

A digital baseband modulation apparatus includes: a spread modulation part for complex spreading an I component signal and a Q component signal of a send signal so as to output an output signal; and an amplitude conversion part for decreasing the amplitude component of the output signal to the half when the output signal is output on the I axis or on the Q axis.

7 Claims, 16 Drawing Sheets

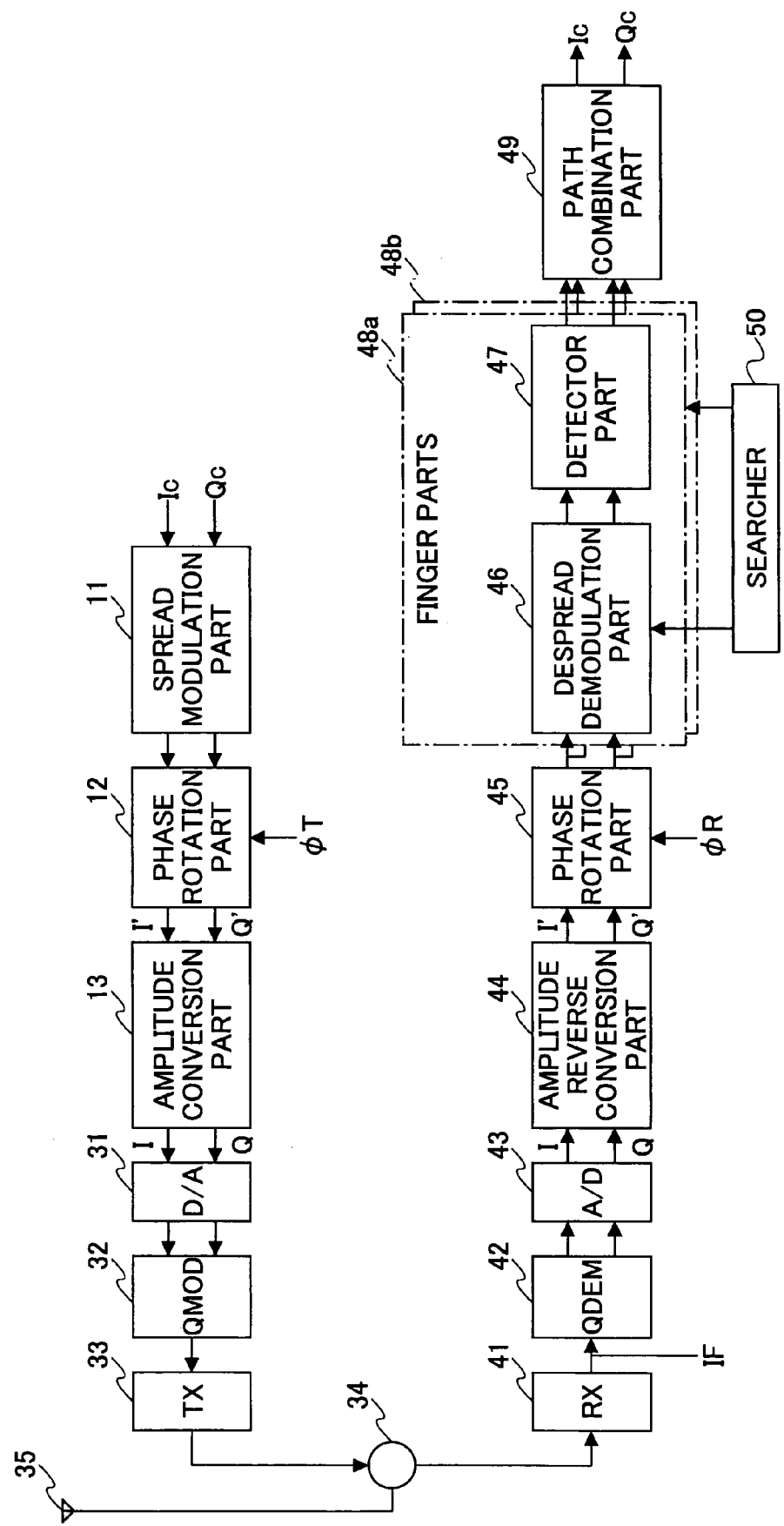

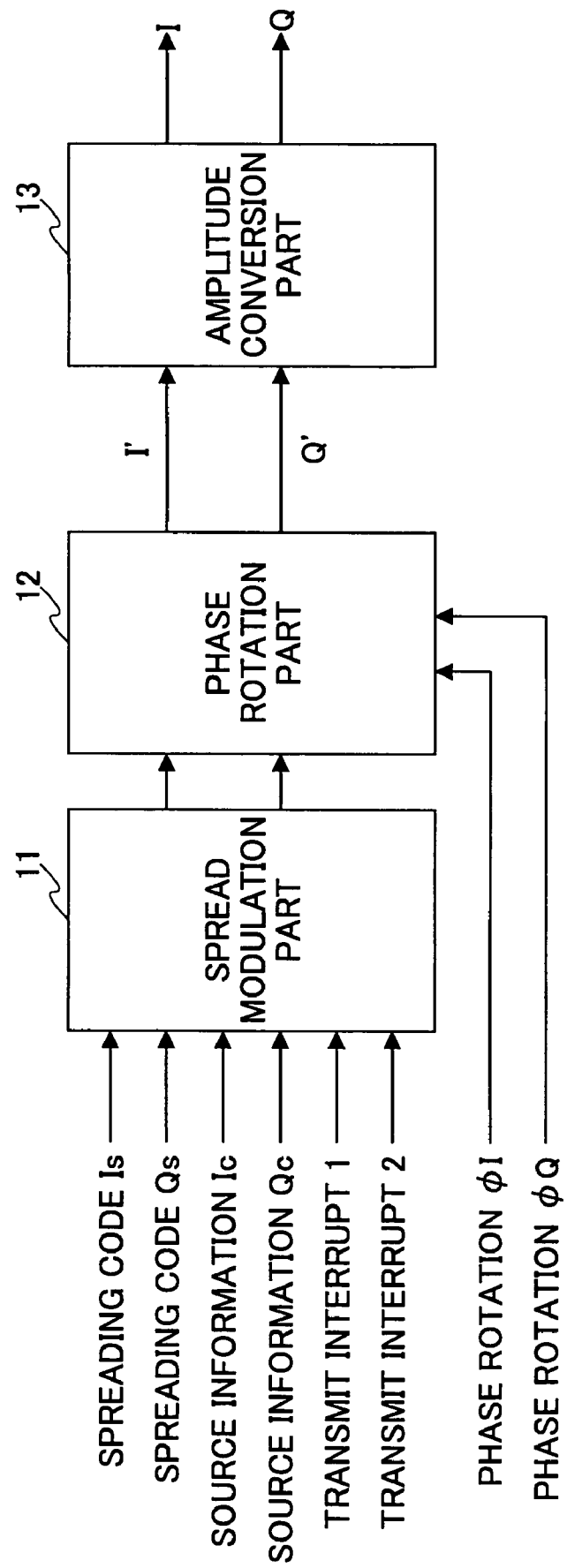

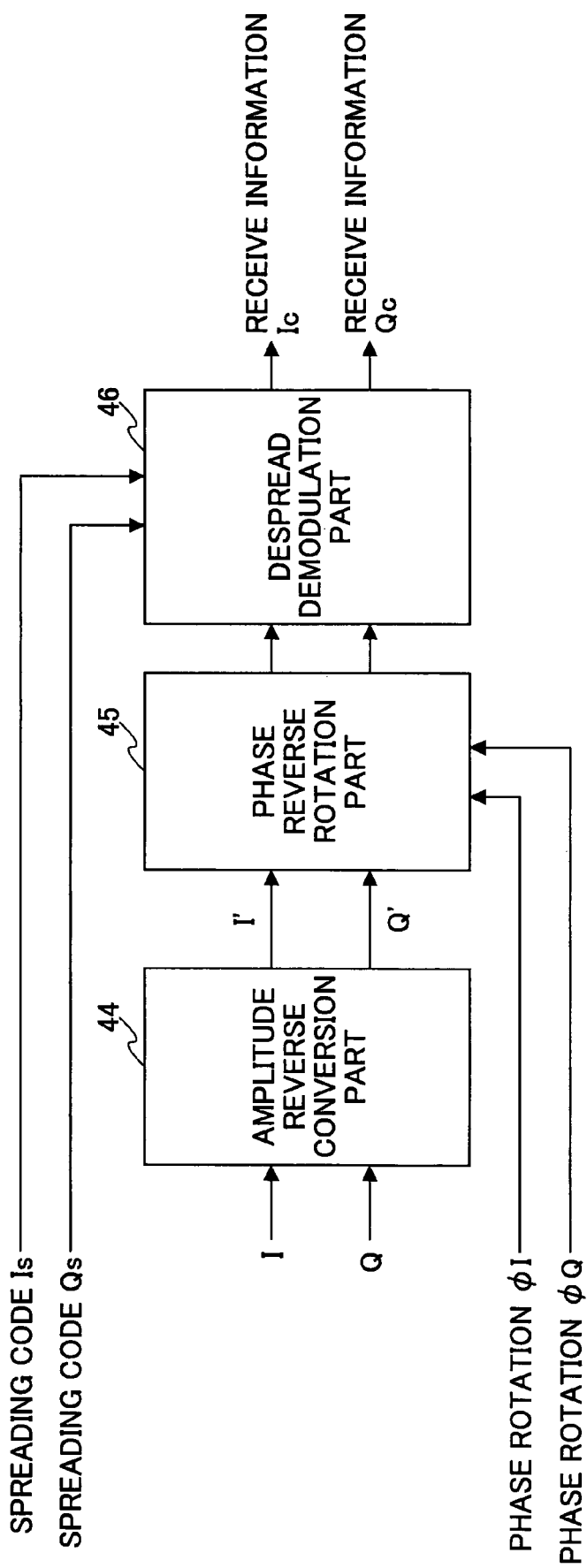

FIG.6A
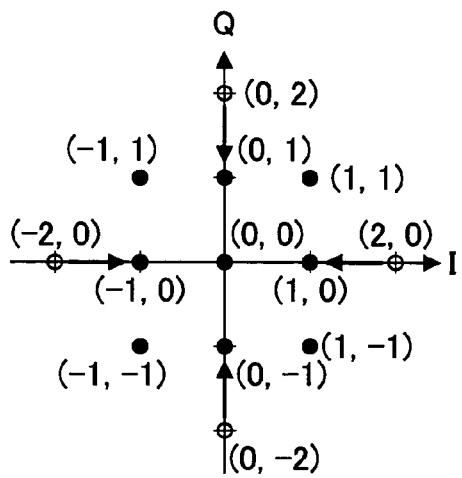
FIG.6B
| CODE | | INPUT | | | | | | OUTPUT | | | |
|---|---|---|---|---|---|---|---|---|---|---|---|
| I | Q | SI | I1 | I0 | SQ | Q1 | Q0 | SI | I0 | SQ | Q0 |
| 0 | 0 | 0 | 0 | 0 | 0 | 0 | 0 | 0 | 0 | 0 | 0 |
| 2 | 0 | 0 | 1 | 0 | 0 | 0 | 0 | 0 | 1 | 0 | 0 |
| 1 | 1 | 0 | 0 | 1 | 0 | 0 | 1 | 0 | 1 | 0 | 1 |
| 0 | 2 | 0 | 0 | 0 | 0 | 1 | 0 | 0 | 0 | 0 | 1 |
| -1 | 1 | 1 | 0 | 1 | 0 | 0 | 1 | 1 | 1 | 0 | 1 |
| -2 | 0 | 1 | 1 | 0 | 0 | 0 | 0 | 1 | 1 | 0 | 0 |
| -1 | -1 | 1 | 0 | 1 | 1 | 0 | 1 | 1 | 1 | 1 | 1 |
| 0 | -2 | 0 | 0 | 0 | 1 | 1 | 0 | 0 | 0 | 1 | 1 |
| 1 | -1 | 0 | 0 | 1 | 1 | 0 | 1 | 0 | 1 | 1 | 1 |
FIG.6C
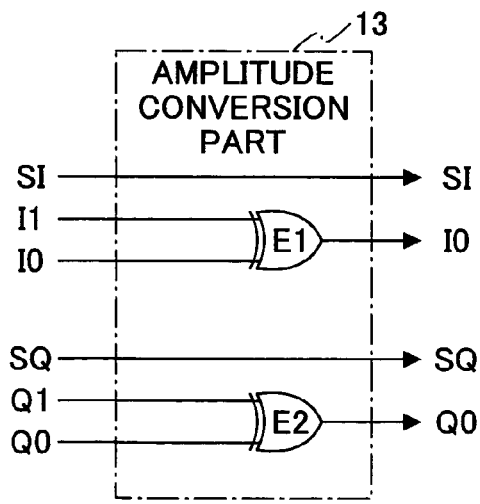

FIG.7A
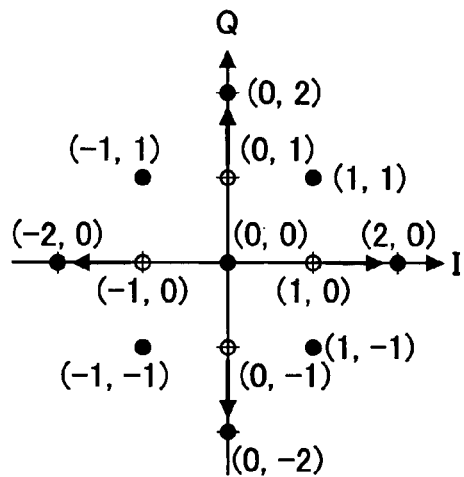
FIG.7B
| INPUT | | | | OUTPUT | | | | | | CODE | |
|---|---|---|---|---|---|---|---|---|---|---|---|
| SI | I0 | SQ | Q0 | SI | I1 | I0 | SQ | Q1 | Q0 | I | Q |
| 0 | 0 | 0 | 0 | 0 | 0 | 0 | 0 | 0 | 0 | 0 | 0 |
| 0 | 1 | 0 | 0 | 0 | 1 | 0 | 0 | 0 | 0 | 2 | 0 |
| 0 | 1 | 0 | 1 | 0 | 0 | 1 | 0 | 0 | 1 | 1 | 1 |
| 0 | 0 | 0 | 1 | 0 | 0 | 0 | 0 | 1 | 0 | 0 | 2 |
| 1 | 1 | 0 | 1 | 1 | 0 | 1 | 0 | 0 | 1 | -1 | 1 |
| 1 | 1 | 0 | 0 | 1 | 1 | 0 | 0 | 0 | 0 | -2 | 0 |
| 1 | 1 | 1 | 1 | 1 | 0 | 1 | 1 | 0 | 1 | -1 | -1 |
| 0 | 0 | 1 | 1 | 0 | 0 | 0 | 1 | 1 | 0 | 0 | -2 |
| 0 | 1 | 1 | 1 | 0 | 0 | 1 | 1 | 0 | 1 | 1 | -1 |
FIG.7C
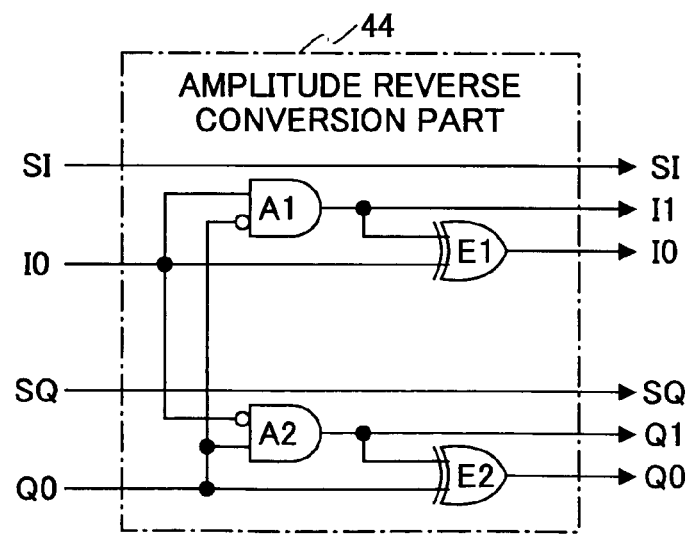

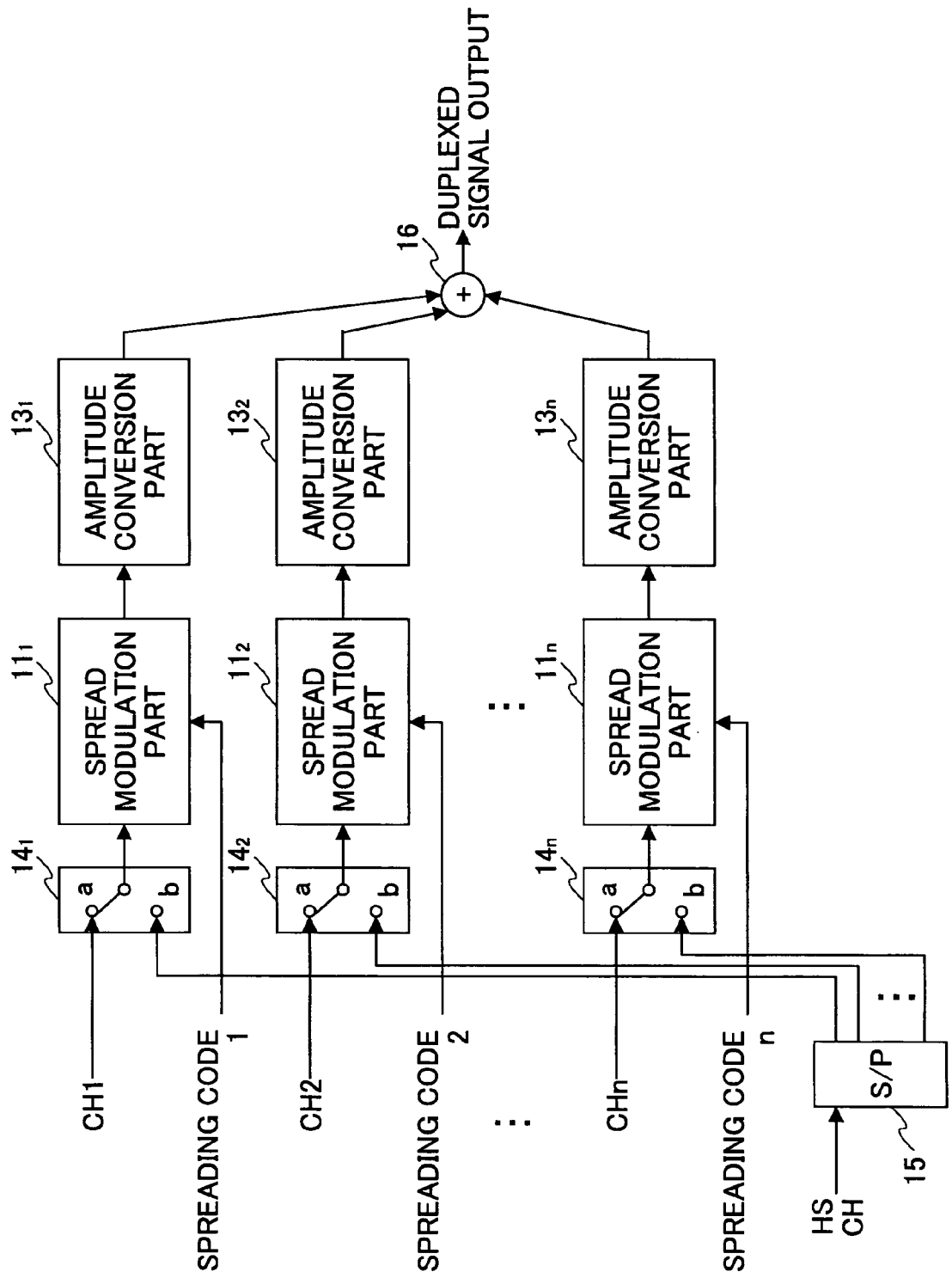

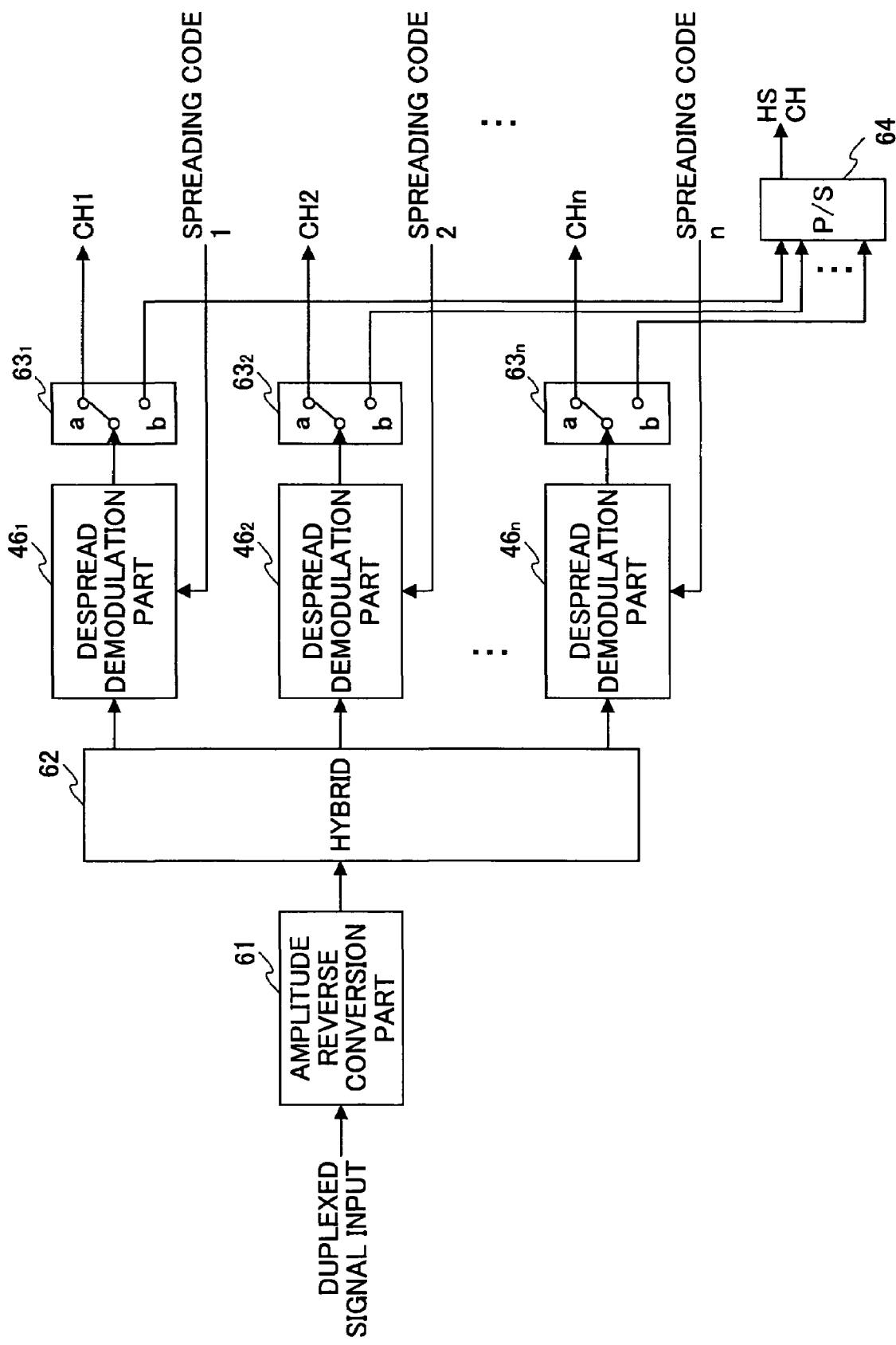

FIG.10B $$(\pm N, 0) \rightarrow (\pm 2N, 0)$$

$$(0, \pm N) \rightarrow (0, \pm 2N)$$

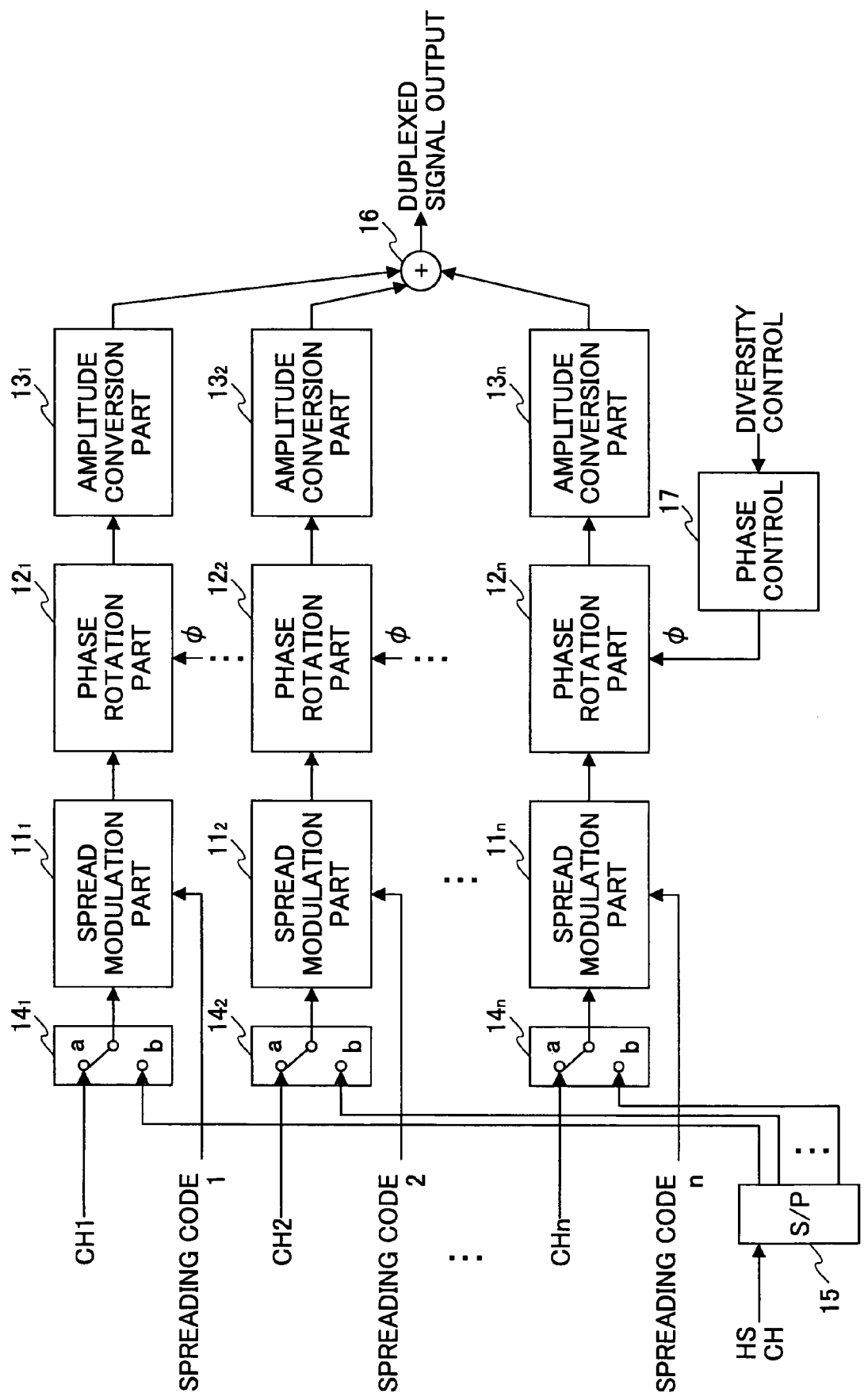

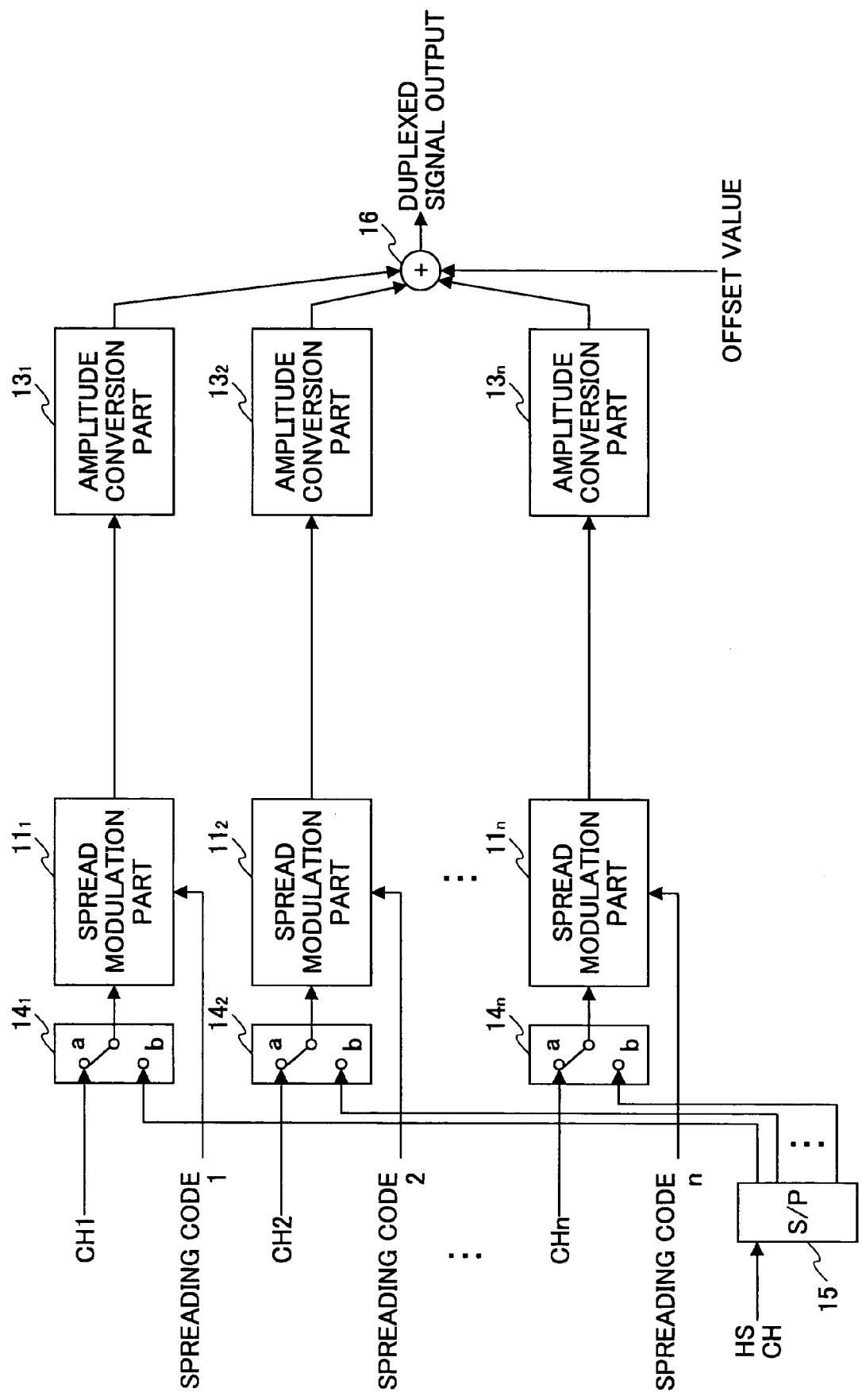

DIGITAL BASEBAND MODULATION APPARATUS AND DEMODULATION APPARATUS

BACKGROUND OF THE INVENTION

1. Field of the Invention

The present invention relates to digital baseband modulation/demodulation apparatuses. More particularly, the present invention relates to digital baseband modulation/demodulation apparatuses applicable to base stations or mobile stations in a CDMA (Code Division Multiple Access) cellular communication system in which spread spectrum modulation by QPSK is performed as a primary modulation method.

In the next generation cellular phone system represented by IMT-2000, it is required to realize large capacity packet transmission system called HSDPA (High Speed Downlink Packet Access). In addition, it is desired to miniaturize apparatuses used in the system and to reduce power consumption of the apparatuses.

2. Description of the Related Art

FIGS. 1A, 1B and FIG. 2 are diagrams for explaining a conventional technology. FIG. 1A is a block diagram showing a three level QPSK modulation apparatus applicable to the IMT-2000 standard. The number 11 indicates a spread modulation part for complex spreading a pair of an Ic component and a Qc component of an input digital signal by using spreading code Is and Qs, wherein Is corresponds to the I axis, and Qs corresponds to the Q axis. The number 12 shows a phase rotation part for rotating the phase of the output signal from the spread modulation part 11. FIG. 2 is a block diagram of a demodulation apparatus corresponding to the modulation apparatus shown in FIG. 1A. In FIG. 2, 45 indicates a phase reverse rotation part and 46 indicates a despread demodulation part.

In FIG. 1A, a complex spread output signal (I, Q) output from the spread modulation part 11 is represented as:

$$I = Ic \cdot Is - Qc \cdot Qs$$

$$Q = Ic \cdot Qs + Qc \cdot Is$$

where Ic is send information spread by channelization code Cd, Qc is source information spread by channelization code Cc, Is is spreading code for the I axis, and Qs is spreading code for the Q axis.

The pair of I and Q component signals can be-represented as complex representation as follows in which I corresponds to the real number axis and Q corresponds to the imaginary number axis:

$$I + jQ = Ac \cdot As \cdot e^{j(\phi c + \phi s)}$$

where Ac is the amplitude of a signal Ic+jQc, $\phi c$ is the phase of Ic+jQc, As is the amplitude of the signal Is+jQs, and $\phi s$ is the phase of Is+jQs.

The spread modulation part 11 has a transmit interrupt function (DXT) formed by AND gates A1-A4. The phase rotation part 12 is a part of a transmit diversity function for transmitting the same source information signals by shifting the phases.

FIG. 1B shows constellations on a complex plain for the modulation apparatus. In the figure, (a) shows a case where there is no phase rotation, and the signal amplitude on I/Q axes takes three levels (1, 0, −1), and there are five signal points including the origin point (I, Q)=(0, 0). In the figure, (b) shows a case where there is a phase rotation of 45° in which there are 9 signal points.

However, if the constellation in which the phase is rotated is adopted, the amplitude (2) of a signal output only on the I axis or only on the Q axis by the spread modulation part is two times of the amplitude (1) of other signal points. That is, 2 bits are necessary in a signal amplitude part. This results in increasing of the circuit size and the power consumption of the baseband modulation/demodulation apparatus.

SUMMARY OF THE INVENTION

An object of the present invention is to provide digital baseband modulation/demodulation apparatuses for realizing high speed transmission while decreasing the size and the power consumption of the apparatuses.

The above object is achieved by a digital baseband modulation apparatus, including:

a spread modulation part for complex spreading an I component signal and a Q component signal of a transmit signal by using spreading code for I axis and spreading code for Q axis so as to output an output signal comprising an output I component signal and an output Q component signal; and an amplitude conversion part for decreasing the amplitude component of the output signal to the half when the output signal is output on the I axis or on the Q axis.

According to the present invention, the size (number of bits and the like) of the process circuits and transmit power consumption can be decreased. Thus, the size of the whole circuits can be downsized.

The above object is also achieved by a digital baseband demodulation apparatus, including:

a part for quadrature detecting an I component signal and a Q component signal from a received signal;

an amplitude reverse conversion part for doubling the amplitude component of the received signal when the received signal is on the I axis or on the Q axis; and a despread demodulation part for complex despreading the I component signal and the Q component signal by using spreading code for I axis and spreading code for Q axis to obtain a complex despread signal.

According to the present invention, the size (number of bits and the like) of the process circuits for air interface and receive power consumption can be decreased. Thus, the size of the whole circuits can be downsized.

BRIEF DESCRIPTION OF THE DRAWINGS

Other objects, features and advantages of the present invention will become more apparent from the following detailed description when read in conjunction with the accompanying drawings, in which:

FIG. 4 is a block diagram showing a part of a communication apparatus (for example, a mobile terminal) which is based on an embodiment of the present invention;

FIG. 5A is a block diagram of a modulation part which is based on the first embodiment of the present invention;

FIG. 5B is a block diagram of a demodulation part which is based on the first embodiment of the present invention;

FIG. 6A shows constellations before and after performing amplitude conversion process which is based on the first embodiment of the present invention;

FIG. 6B is a truth table used for realizing the above-mentioned amplitude conversion process;

FIG. 6C is a logic circuit diagram for realizing the above-mentioned truth table;

FIG. 7A shows constellations before and after performing amplitude reverse conversion process which is based on the first embodiment of the present invention;

FIG. 7B is a truth table for realizing the above-mentioned amplitude reverse conversion process;

FIG. 7C is a logic circuit diagram for realizing the above-mentioned truth table;

FIG. 8A is a block diagram of a modulation part which is based on the second embodiment of the present invention;

FIG. 10A is a block diagram of the demodulation part which is based on the second embodiment of the present invention;

FIG. 10B shows reverse conversion characteristics of the amplitude reverse conversion part which is based on the second embodiment of the present invention;

FIG. 11 is a block diagram of a modulation part of the third embodiment of the present invention;

FIG. 12A is a block diagram of a modulation part which is based on the fourth embodiment of the present invention;

DETAILED DESCRIPTION OF THE PREFERRED EMBODIMENTS

First, an outline of embodiments of the present invention is described in the following. A digital baseband modulation apparatus of the present invention includes: a spread modulation part for complex spreading an I component signal and a Q component signal of a transmit signal by using spreading code for I axis and spreading code for Q axis so as to output an output signal comprising an output I component signal and an output Q component signal; and an amplitude conversion part for decreasing the amplitude component of the output signal to the half when the output signal is output on the I axis or on the Q axis.

Figure 1A:
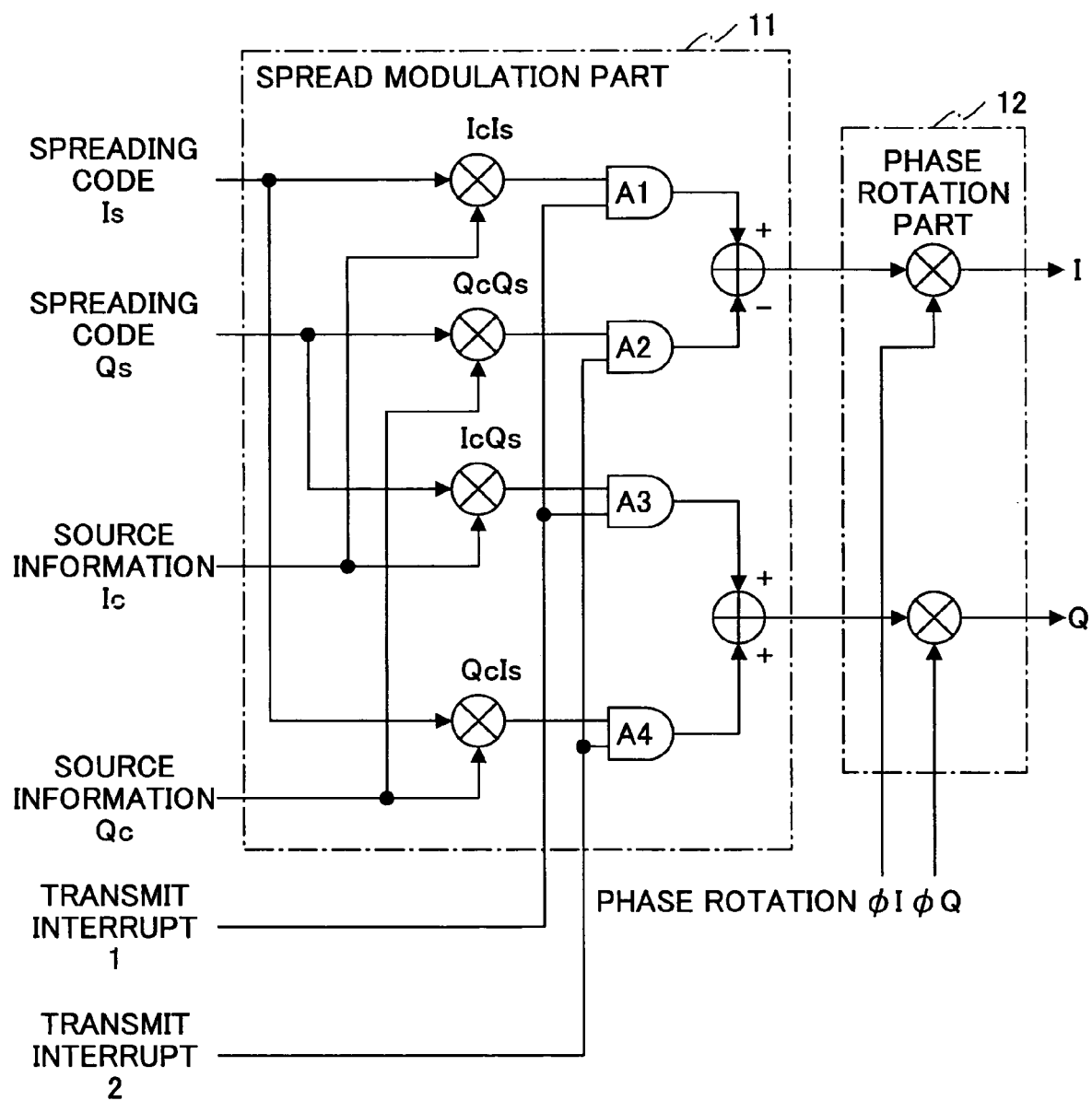
FIG. 1A is a block diagram showing a three level QPSK modulation apparatus applicable to the IMT-2000 standard.
Figure 1B:
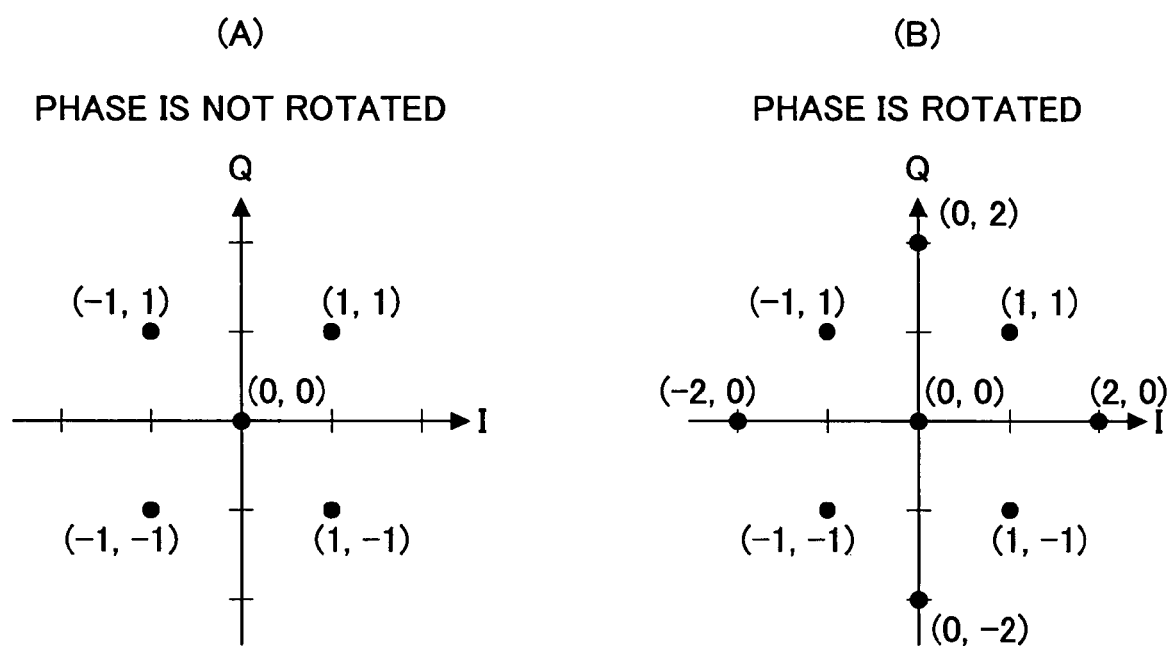
FIG. 1B shows constellations on a complex plain for the modulation apparatus shown in FIG. 1A.
Figure 2:
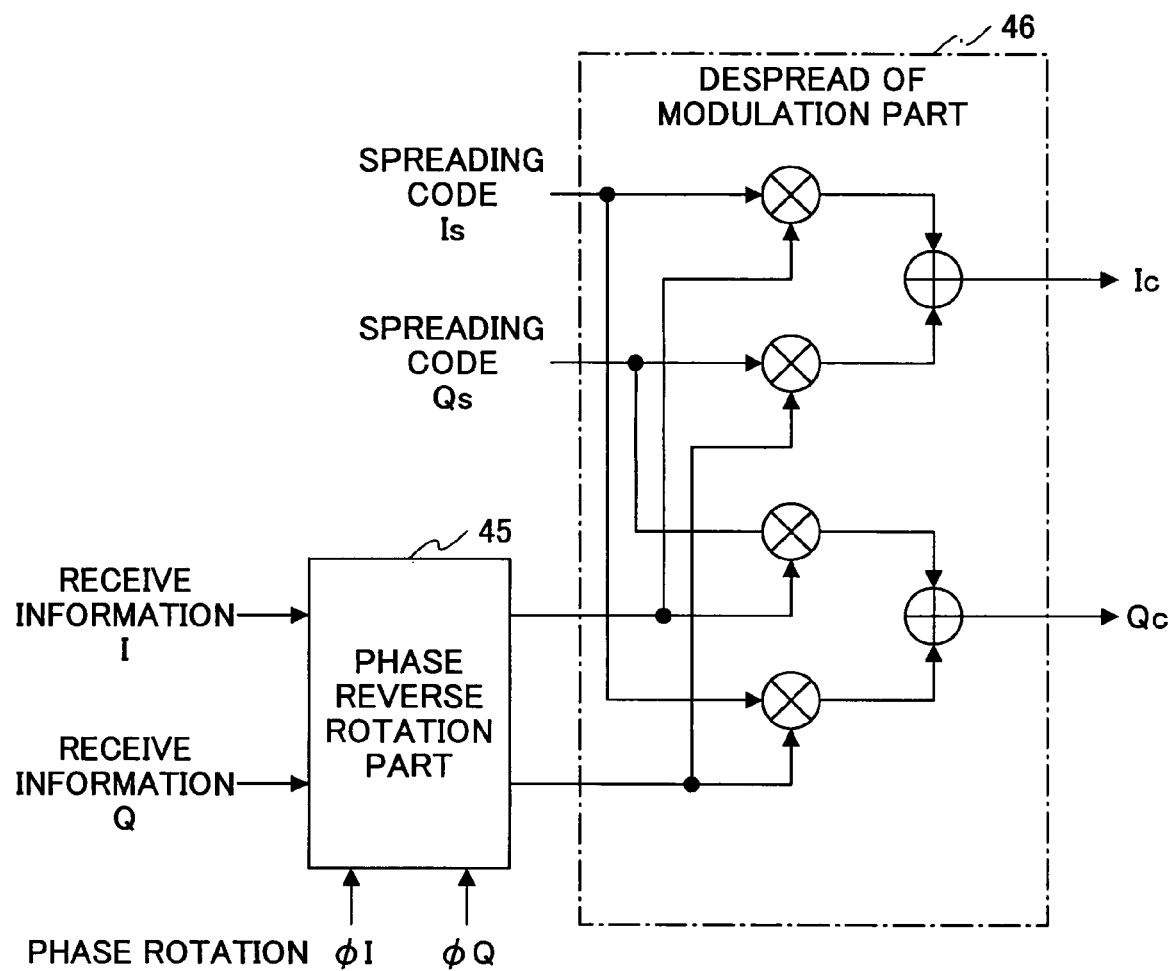
FIG. 2 is a block diagram of a demodulation apparatus corresponding to the modulation apparatus shown in FIG. 1A.
Figure 3A:
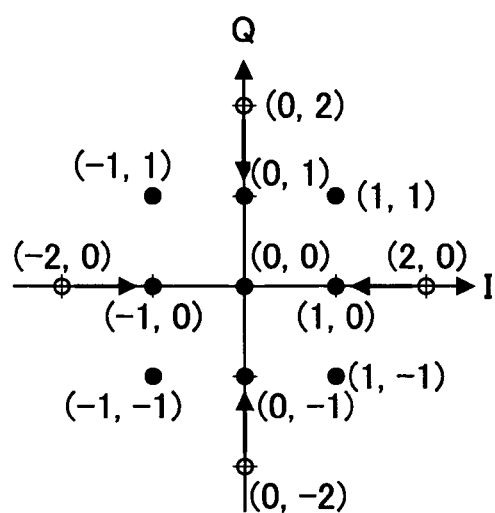
FIG. 3A shows a constellation for explaining the principle of the present invention in modulation.

For example, as shown in FIG. 3A, the amplitude conversion part converts signals (I, Q)=(−2, 0), (2, 0), (0, −2), and (0, 2), output from the spread modulation part on the I axis or the Q axis, into (I, Q)=(−1, 0), (1, 0), (0, −1), and (0, 1). That is, the amplitude component (=2) of the output signal is decreased to the half (=1).

In the digital baseband modulation apparatus, the spread modulation part may include a phase rotation part for rotating the phase angle of the output signal according to a control from the outside. Thus, transmit diversity can be efficiently realized by rotating the phase.

A digital baseband demodulation apparatus of the present invention includes: a part for quadrature detecting an I component signal and a Q component signal from a received signal; an amplitude reverse conversion part for doubling the amplitude component of the received signal when the received signal is on the I axis or on the Q axis; and a despread demodulation part for complex despreading the I component signal and the Q component signal by using spreading code for I axis and spreading code for Q axis to obtain a complex despread signal.

Figure 3B:
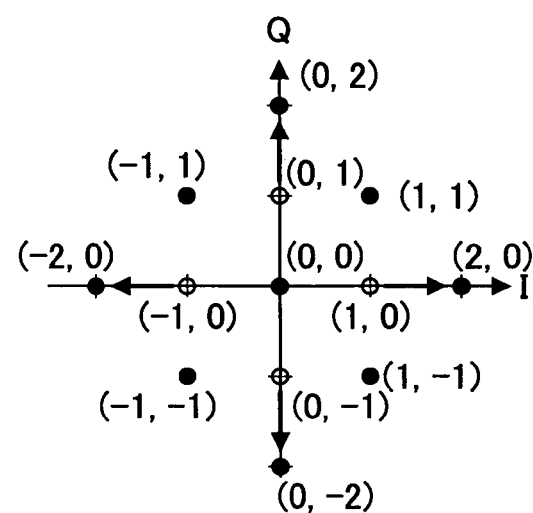
FIG. 3B shows a constellation for explaining the principle of the present invention in demodulation.

As shown in FIG. 3B, the amplitude reverse conversion part doubles the amplitude component (=1) of the received signal (I, Q)=(−1, 0), (1, 0), (0, −1) and (0, 1) that are on the I axis or on the Q axis. Accordingly, the signals (I, Q)=(−1, 0), (1, 0), (0, −1) and (0, 1) are reconstructed to (I, Q)=(−2, 0), (2, 0), (0, −2) and (0, 2).

In the digital baseband demodulation apparatus, the despread demodulation part may include a phase rotation part for rotating the phase of the complex despread signal according to a control from the outside. Thus, receive diversity can be efficiently realized by rotating the phase.

In addition, another digital baseband modulation apparatus of the present invention includes, as shown in FIG. 8A, a plurality of pairs of the above-mentioned spread modulation part and the above-mentioned amplitude conversion part; a duplexing part for duplexing output signals output from the amplitude conversion parts by linearly adding the output signals; a separation part for separating a received high speed channel signal into a plurality of separated signals to be input into the spread modulation parts; and a switch part for switching between the separated signals and received low speed channel signals to input the separated signals or the received low speed channel signals into the spread modulation parts.

Figure 8B:
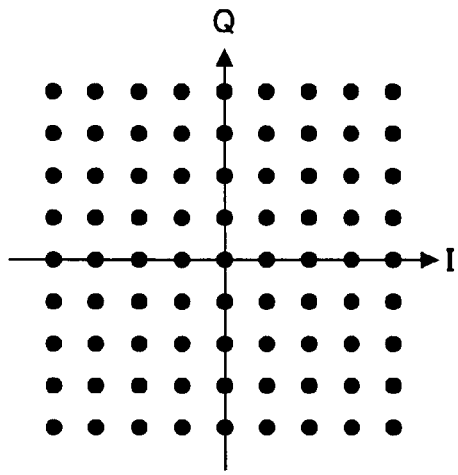
FIG. 8B shows the constellation of a duplexed signal which is based on the second embodiment of the present invention.

FIG. 8B shows a constellation of the signal output from the duplexing part 16. Since each amplitude component of signals output from the amplitude conversion parts on the I axis or on the Q axis are decreased to the half, the amplitude component of the duplexed signal is also decreased. Thus, the large capacity data transmission (HSDPA) can be realized with smaller circuit and lower power consumption. In the digital baseband modulation apparatus, the duplexing part may add an offset value to each I component signal when the value of the I component signal is 0 and add an offset value to each Q component signal when the value of the Q component signal is 0. By adding the offset value to prevent I component or Q component from becoming 0. Accordingly, the process amount of a signal processing part can be decreased and dynamic range of a power amplifying part can be decreased.

In the following, embodiments of the present invention will be described. Same symbols are assigned to the same or corresponding parts throughout the drawings.

FIG. 4 is a block diagram showing a part of a communication apparatus (for example, a mobile terminal) which is based on an embodiment of the present invention. In the figure, 11 is a spread modulation part, 12 is a phase rotation part, 13 is an amplitude conversion part, 31 is a D/A conversion part, 32 is a quadrature modulation part (QMOD), 33 is a RF modulation part (TX) for up converting the quadrature modulated signal to the RF signal, 34 is a transmit/receive wave switch part, 35 is an antenna, 41 is a RF demodulation part (RX) for down converting the received RF signal to the baseband signal, 42 is a quadrature demodulation part (QDEM), 43 is an A/D conversion part, 44 is an amplitude reverse conversion part, 45 is a phase rotation part, 46 is a despread demodulation part, 47 is a detector part, 48a and 48b show each finger part, 49 is a path combination part (RAKE combination part), and 50 is a searcher.

FIGS. 5A and 5B are block diagrams of the modulation/demodulation parts which are based on the first embodiment, in which a pair of the I component channel signal and the Q component-signal is modulated/demodulated. FIG. 5A is a block diagram of the modulation part. The modulation part includes the spread modulation part 11, the phase rotation part 12 and the amplitude conversion part 13 in which the amplitude conversion part 13 is provided at the back of the phase rotation part 12. FIG. 5B is a block diagram of the demodulation part that includes the amplitude reverse conversion part 44, the phase reverse rotation part 45 and the despread demodulation part 46 in which the phase reverse rotation part 45 and the despread demodulation part 46 are provided behind the amplitude reverse conversion part 44.

FIGS. 6A-6C are diagrams for explaining the amplitude conversion part according to the first embodiment. FIG. 6A shows constellations before and after performing the amplitude conversion process. The amplitude of the input signal on the I or Q axis takes one of three levels of (−2, 0, 2). The amplitude of other signals takes one of three levels of (−1, 0, 1). The amplitude conversion part reduces the amplitude (=2) of the signal on the I axis or the Q axis into the half. That is, the signals (I, Q) =(−2, 0) , (2, 0), (0, −2) and (0, 2) are converted to signals (I, Q)=(−1, 0), (1, 0), (0, −1) and (0, 1) respectively. Therefore, the size (number of bits and the like) of the process circuits and transmit power consumption can be decreased.

FIG. 6B is a truth table used for the above-mentioned amplitude conversion process. As shown in the table, only when the amplitude component (I1, I0) or (Q1, Q0) of the input signal is (1, 0) or (0, 1), the amplitude component (I0) or (Q0) is converted to 1 and only the one bit is output. Accordingly, the amplitude component of the output signal can be reduced to 1 bit.

FIG. 6C is a logic circuit diagram that realizes the above truth table. As shown in the figure, the 1 bit sign of the input signal SI/SQ is output as it is. As to two bits amplitude components (I1, I0) and (Q1, Q0), EX-OR is calculated between I1 and I0, and between Q1 and Q0, so that amplitude of the output signal can be reduced to 1 bit amplitude component I0 and Q0.

FIGS. 7A-7C are diagrams for explaining the amplitude reverse conversion part which are based on the first embodiment. FIG. 7A shows constellations before and after performing amplitude reverse conversion process. The amplitude of the input signal of the amplitude reverse part takes one of three levels of (−1, 0, 1) regardless whether the input signal is on the I/Q axis or not. The amplitude reverse conversion part increases the amplitude (=1) of the signal on the I axis or on the Q axis to double (=2). That is, signals (I, Q)=1, 0), (1, 0), (0, −1) and (0, 1) are reconstructed to signals (I, Q)=(−2, 0), (2, 0), (0, −2) and (0, 2) respectively. Therefore, the receiving side can be in harmony with the sending side.

FIG. 7B is a truth table for realizing the above-mentioned amplitude reverse conversion process. As shown in the table, if (I0, Q0) is (1, 0) or (0, 1), amplitude component (I1, I0), (Q1, Q0) is converted to (1, 0), (0, 0) or (0, 0), (1, 0) respectively. Accordingly, the amplitude component of each of the I component signal and Q component signal can be reconstructed to two bits, that is, (I1, I0) or (Q1, Q0).

FIG. 7C is a logic circuit diagram for realizing the above truth table. As shown in the figure, 1 bit sign of input signal SI/SQ is output as it is. As to one bit amplitude component (I0) or (Q0), a logic shown in the figure is applied so that two bit amplitude component (I1, I0) or (Q1, Q0) can be reconstructed.

FIG. 8A is a block diagram of the modulation part which is based on the second embodiment of the present invention, in which signals of a plurality of channels each comprising a pair of I component signal and Q component signal are duplexed and transmitted. In the figure, 11$_1$-11$_n$ are spread modulation parts, 13$_1$-13$_n$ are amplitude conversion parts, 14$_1$-14$_n$ are switches, 15 is a serial to parallel conversion part (S/P) for separating an input signal of a high speed channel HSCH into signals of low speed channels, and 16 is a duplexing part for linearly adding (duplexing) output signals from the amplitude conversion parts 13$_1$-13$_n$.

The modulation part accommodates n low speed channels CH1-CHn for transmitting sounds and the like, and one high-speed channel HSCH for transmitting image data and the like. Each channel signal includes quadrature pair of the I component signal and the Q component signal.

When each of the switches 14$_1$-14$_n$ is connected to a terminal a, the n low speed channel signals are duplexed and sent. When each of the switches 14$_1$-14$_n$ is connected to a terminal b, data of low speed channel signals that are obtained by separating the high speed channel signal HSCH are duplexed and sent. FIG. 8B shows the constellation of the multiplexed signal.

Figure 9:
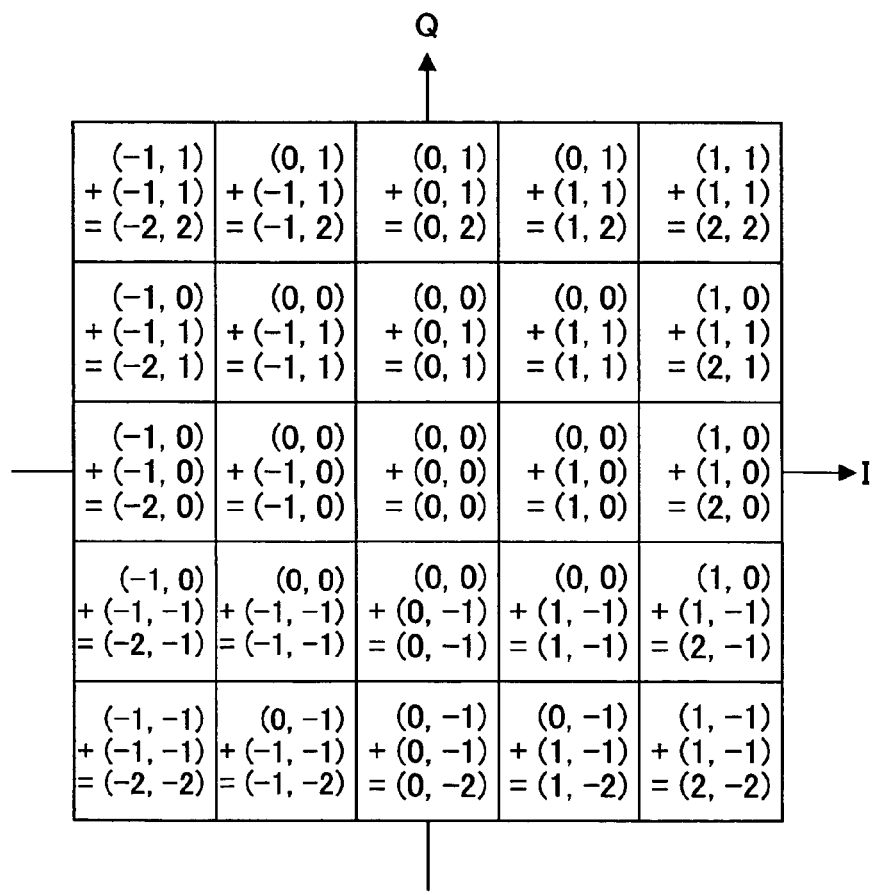
FIG. 9 is a diagram for explaining a process for duplexing signal points which is based on the second embodiment.

FIG. 9 is a diagram for explaining a process for multiplexing signal points which is based on the second embodiment. For the sake of simplicity, FIG. 9 shows a case in which I, Q data of two channels CH1 and CH2 are duplexed (linearly added).

First, signals duplexed on the I or Q axis will be described. When source data of CH1 is (I, Q)=(0, 0), and source data of CH2 is (I, Q)=(0, 0), duplexed source data is (I, Q)=(0, 0). Next, when source data of CH1 is (I, Q)=(0, 0), and source data of CH2 is (If Q)=(0, 1), duplexed source data is (I, Q)=(0, 1). In addition, when source data of CH1 is (I, Q)=(0, 1), and source data of CH2 is (I, Q)=(0, 0), duplexed source data is also (I, Q)=(0, 1). Thus, since both amplitudes are 1, they cannot be distinguished from each other from the viewpoint of amplitude. However, the former duplexed source data (I, Q)=(0, 1) are spread/despread by spreading code of CH2, and latter duplexed source data (I, Q)=(0, 1) are spread/despread by spreading code of CH1. Therefore, they can be distinguished from each other.

When source data of CH1 is (I, Q)=(0, 1), and source data of CH2 is (I, Q)=(0, 1), duplexed source data is (I, Q)=(0, 2). The other combinations can be obtained in the same way.

Next, signals duplexed in quadrants other than the I axis or the Q axis are explained. When source data of CH1 is (I, Q)=(0, 0), and source data of CH2 is (I, Q)=(1, 1), duplexed source data is (I, Q)=(1, 1). In addition, when source data of CH1 is (I, Q)=(1, 1), and source data of CH2 is (I, Q)=(0, 0), duplexed source data is also (I, Q)=(1, 1). When source data of CH1 is (I, Q)=(1, 1), and source data of CH2 is (I, Q)=(1, 1), duplexed source data is (I, Q)=(2, 2).

When both of phase rotation amounts of CH1 and CH2 are equally 0° or 45° (in phase synchronization), there is no combination other than the above-mentioned examples. However, when the phase rotation amounts of CH1 and CH2 are not the same (asynchronous), there are following combinations further. When source data of CH1 is (I, Q)=(0, 1) (this means that the data reside on the Q axis), and source data of CH2 is (I, Q)=(1, 1) (this means that the data reside in the first quadrant), duplexed source data is (I, Q)=(1, 2). When source data of CH1 is (I, Q)=(1, 1), and source data of CH2 is (I, Q)=(0, 1), duplexed source data is also (I, Q)=(1, 2). Other combinations can be obtained in the same way. As mentioned above, according to the present invention, large amount of information can be transmitted efficiently by utilizing the finite complex I, Q plane (wireless space).

FIG. 10A is a block diagram of the demodulation part which is based on the second embodiment of the present invention, in which the demodulation part separates the duplexed received signal into a plurality of signals and demodulates each signal. In the figure, 61 is an amplitude reverse conversion part for reverse converting the amplitude of the duplexed signal, 62 is a hybrid for distributing signals after the amplitude reverse conversion, 46₁-46ₙ are despread demodulation parts corresponding to each separated channel signal, 63₁-63ₙ are switches, and 64 is a parallel to serial conversion part (P/S).

FIG. 10B shows reverse conversion characteristics of the amplitude reverse conversion part. As shown in the figure, the input signal (±N, 0) that exists only on I axis is reverse converted to (±2N, 0) and the input signal (0, ±N) that exists only on Q axis is reverse converted to (0, ±2N), where N indicates the number of multiplexed channels.

FIG. 11 is a block diagram of a modulation part of the third embodiment, in which the modulation part has a transmit diversity function. In the figure, $12_1$-$12_n$ are phase rotation parts, 17 is a phase control part. In the third embodiment, phase rotation parts $12_1$-$12_n$ are provided for each channel, so that transmit diversity control can be performed. Thus, communication quality can be improved.

FIG. 12A is a block diagram of a modulation part according to the fourth embodiment, in which a predetermined level offset is added to the output signal from the duplexing part. Following offset process is performed in the duplexing part 16. Predetermined offset values $\varDelta$I and $\varDelta$Q are added to I and Q levels respectively if the added result becomes a plus level (0 is considered to be +0). Other I and Q component signals are output as it is.

Figure 12B:
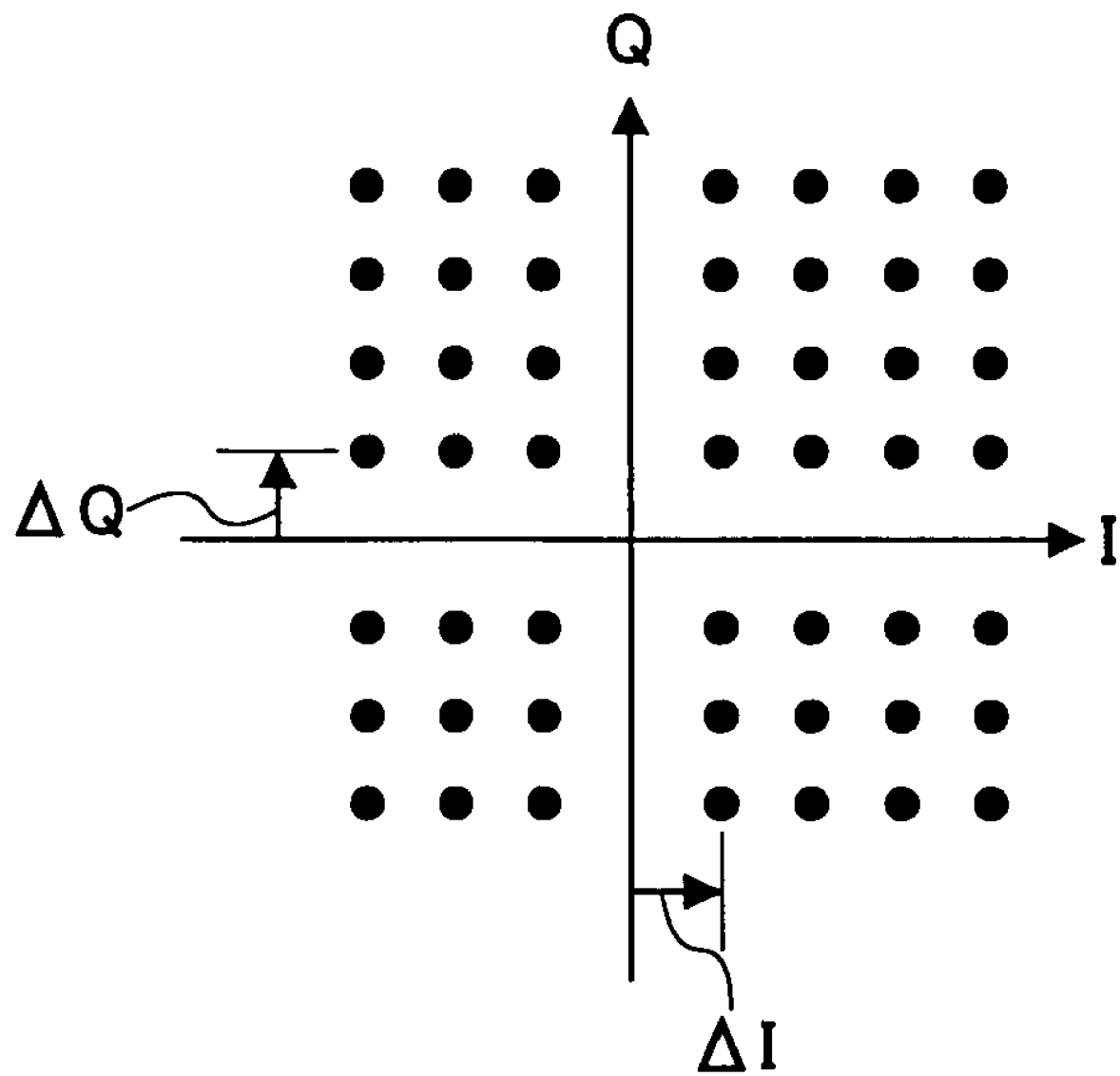
FIG. 12B shows a constellation after the offset values are added which is based on the fourth embodiment of the present invention.

FIG. 12B shows a constellation after the offset levels are added. For example, if the duplexed output is (I, Q)=(0, 1), offset values are added such that (0+$\varDelta$I, 1+$\varDelta$Q). If (I, Q)= (0, −1), the offset value is added only for the I value such that (0+$\varDelta$I, −1). If (I, Q)=(−1, −1), no offset value is added, and the signal is output as it is. Accordingly, since the duplexed output does not include a signal component of level "0", dynamic range of the multiplexed signal can be decreased.

Although the plus I component signal and the plus Q component signal are shifted to a plus direction in the above-mentioned example, a minus signal component may be shifted to a minus direction. In addition, instead of always adding the offset values, the offset values can be added only when the level of the I component signal or the Q component signal is detected to be "0". In this case, whether the offset is added or not is sent to the receiving side.

Although embodiments are described in which the spread modulation parts 11 are provided for each channel, the present invention is not limited to this. The adder used for complex spread modulation can be removed from each spread modulation part 11, and add functions of the removed adders can be centered to an adder of the multiplexing part. Accordingly, the circuit size of the spread modulation parts can be decreased.

As mentioned above, according to the present invention, since the size and the power consumption of the digital baseband modulation/demodulation apparatuses can be decreased, large capacity information can be transmitted efficiently at high speed. Thus, the present invention contributes to develop and popularize the next generation cellular phone system and the like.

The present invention is not limited to the specifically disclosed embodiments, and variations and modifications may be made without departing from the scope of the present invention.

What is claimed is:

1. A digital baseband demodulation apparatus, comprising:
   a quadrature detection unit that detects I component signals and Q component signals with respect to received signals including a first received signal and a second received signal;
   an amplitude control unit that increases an amplitude component of the first received signal by a predetermined factor when the first received signal is on the I axis or on the Q axis, and that does not increase the amplitude component of the second received signal by the predetermined factor when the second received signal is neither on the I axis nor on the Q axis; and
   a despread demodulation unit that complex despreads the I component signals and the Q component signals by using spreading code for the I axis and spreading code for the Q axis to obtain complex despread signals.

2. The digital baseband demodulation apparatus as claimed in claim 1, the despread demodulation unit further comprising a phase rotation unit that rotates the phase of the complex despread signal according to a control from the outside.

3. A digital baseband demodulation apparatus, comprising:
   a quadrature detection unit that detects I component signals and Q component signals with respect to duplexed received signals including a first duplexed received signal and a second duplexed received signal;
   an amplitude control unit that increases an amplitude component of the first duplexed received signal by a predetermined factor when the first duplexed received signal is on the I axis or on the Q axis, and that does not increase the amplitude component of the second duplexed received signal by the predetermined factor when the second duplexed received signal is neither on the I axis nor on the Q axis;
   a separating unit that separates the I component signals and the Q component signals output from the amplitude control unit into separated I component signals and separated Q component signals; and
   despread demodulation units that receive each pair of the separated I component signals and separated Q component signals, each despread demodulation unit complex despreading the pair by using spreading code for the I axis and spreading code for the Q axis.

4. A digital baseband modulation apparatus, comprising:
   a spread modulation unit that complex spreads I component signals and Q component signals with respect to transmit signals including a first transmit signal and a second transmit signal by using spreading code for the I axis and spreading code for the Q axis so as to output a first output signal corresponding to the first transmit signal and a second output signal corresponding to the second transmit signal, wherein the first and second output signals comprise output I component signals and output Q component signals; and
   an amplitude control unit that decreases an amplitude component of the first output signal by a predetermined factor when the first output signal is output on the I axis or on the Q axis, and that does not decrease the amplitude component of the second output signal by the predetermined factor when the second output signal is output neither on the I axis nor on the Q axis.

5. The digital baseband modulation apparatus as claimed in claim 4, wherein the spread modulation unit comprises a phase rotation unit that rotates the phase angle of the output signal according to a control from the outside.

6. A digital baseband modulation apparatus, comprising a plurality of pairs of a spread modulation part and an amplitude conversion part, each pair receiving transmit signals including a first transmit signal and a second transmit signal, wherein the spread modulation part complex spreads I component signals and Q component signals with respect to the transmit signals by using a spreading code for I axis and a spreading code for Q axis so as to output a first output signal corresponding to the first transmit signal and a second output signal corresponding to the second transmit signal, wherein the first and second output signals comprise output I component signals and output Q component signals; and the amplitude conversion part decreases an amplitude component of the first output signal by a predetermined factor when the first output signal is output on the I axis or on the Q axis, and does not decrease the amplitude component of the second output signal by the predetermined factor when the second output signal is output neither on the I axis nor on the Q axis;

the digital baseband modulation apparatus further comprising:

a duplexing part for duplexing output signals output from the amplitude conversion parts by linearly adding the output signals;

a separation part for separating a received high speed channel signal into a plurality of separated signals to be input into the spread modulation parts; and a switch part for switching between the separated signals and received low speed channel signals to input the separated signals or the received low speed channel signals into the spread modulation parts.

7. The digital baseband modulation apparatus as claimed is claim 6, wherein the duplexing part adds an offset value to each I component signal when the value of the I component signal is 0 and adds an offset value to each Q component signal when the value of the Q component signal is 0.

* * * * *